United States Patent
Hama et al.

(10) Patent No.: US 7,878,696 B2
(45) Date of Patent: Feb. 1, 2011

(54) OPTICAL COMPONENT, LIGHT CONVERTING MEMBER, AND LIGHT EMITTING DEVICE

(75) Inventors: Atsutomo Hama, Anan (JP); Yoshinori Murazaki, Komatsushima (JP); Takafumi Sugiyama, Komatsushima (JP); Yukihiro Hayashi, Tokushima (JP); Naoto Morizumi, Yoshinogawa (JP)

(73) Assignee: Nichia Corporation, Anan-Shi (JP)

( * ) Notice: Subject to any disclaimer, the term of this patent is extended or adjusted under 35 U.S.C. 154(b) by 33 days.

(21) Appl. No.: 11/636,965

(22) Filed: Dec. 12, 2006

(65) Prior Publication Data
US 2007/0195538 A1  Aug. 23, 2007

(30) Foreign Application Priority Data
Dec. 12, 2005 (JP) ............... P 2005-357175
Dec. 1, 2006 (JP) ............... P 2006-325846

(51) Int. Cl.
F21V 7/04 (2006.01)
F21V 17/00 (2006.01)
G02B 6/00 (2006.01)

(52) U.S. Cl. ............... 362/555; 362/558; 362/581; 362/583

(58) Field of Classification Search .......... 362/555, 362/551, 554, 581, 572, 574, 583, 84, 293, 362/382
See application file for complete search history.

(56) References Cited

U.S. PATENT DOCUMENTS

| | | | |
|---|---|---|---|
| 6,350,041 B1 * | 2/2002 | Tarsa et al. | 362/231 |
| 6,371,628 B1 * | 4/2002 | Ward | 362/287 |
| 6,447,537 B1 * | 9/2002 | Hartman | 607/94 |
| 6,488,414 B1 * | 12/2002 | Dawes et al. | 385/79 |
| 6,523,984 B2 * | 2/2003 | Belfer | 362/551 |
| 7,011,439 B1 * | 3/2006 | Kane et al. | 362/554 |
| 7,198,398 B2 * | 4/2007 | Buelow et al. | 362/581 |
| 2003/0042493 A1 * | 3/2003 | Kazakevich | 257/98 |
| 2006/0268946 A1 * | 11/2006 | Levatter et al. | 372/6 |
| 2007/0092184 A1 * | 4/2007 | Hama et al. | 385/76 |

FOREIGN PATENT DOCUMENTS

| | | | |
|---|---|---|---|
| JP | 63149611 A * | 6/1988 |
| JP | 2003-515899 A | 5/2003 |
| WO | WO-01/40702 A1 | 6/2001 |

* cited by examiner

*Primary Examiner*—Jong-Suk (James) Lee
*Assistant Examiner*—David R Crowe
(74) *Attorney, Agent, or Firm*—Birch, Stewart, Kolasch & Birch, LLP

(57) ABSTRACT

An optical component that can be attached to an end portion of an optical guiding member, and a light converting member used in the optical component. The optical component comprises a cap having an engaging portion defining a bore engaged with an end member of a light guiding member, and an arranging portion defining a opening connected to the bore in the engaging portion, and a light converting member disposed in the opening formed in the arranging portion.

26 Claims, 14 Drawing Sheets

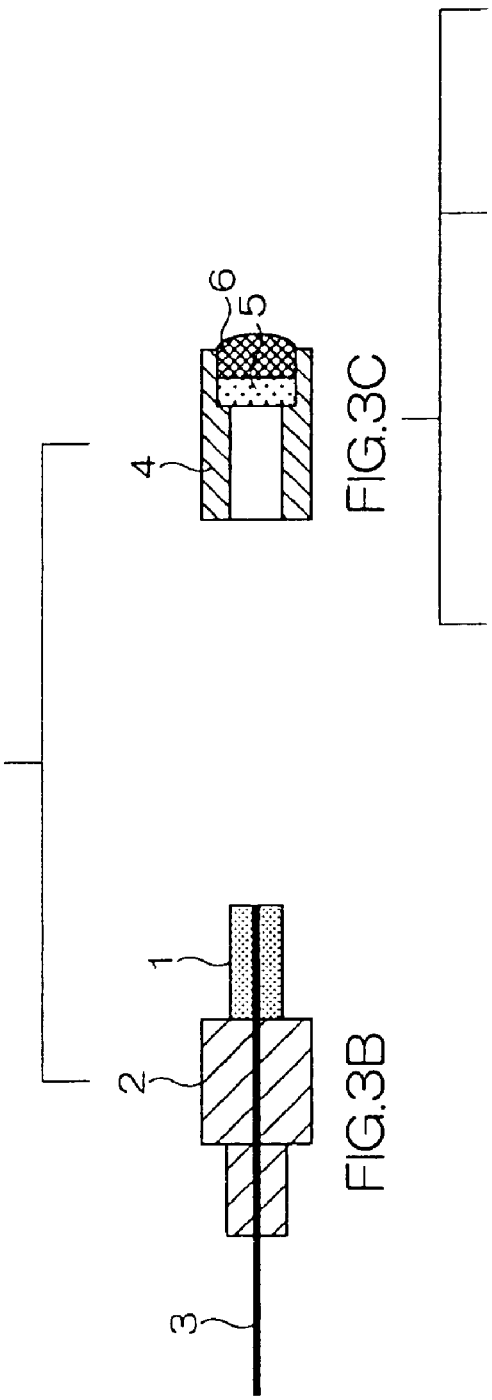
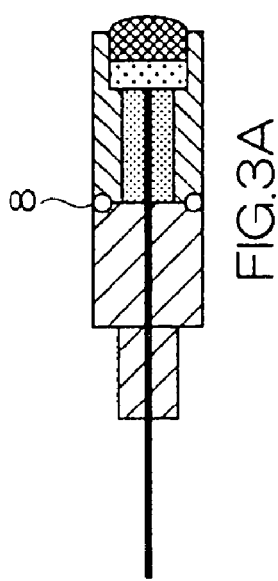
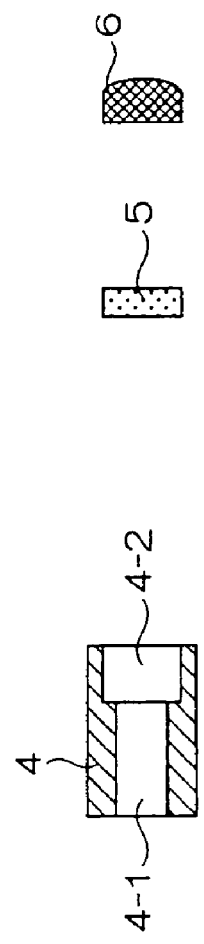
FIG.3

FIG.8
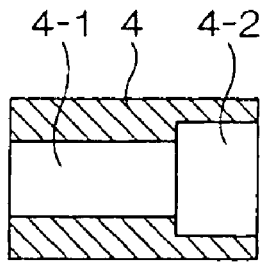
FIG.8A
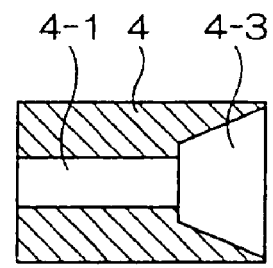
FIG.8B
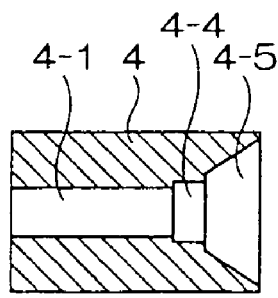
FIG.8C
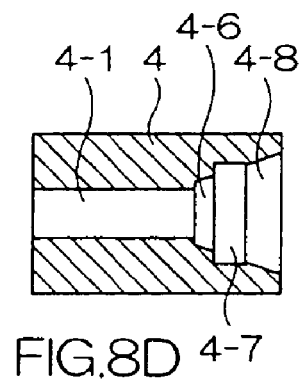
FIG.8D
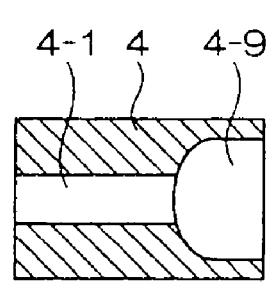
FIG.8E
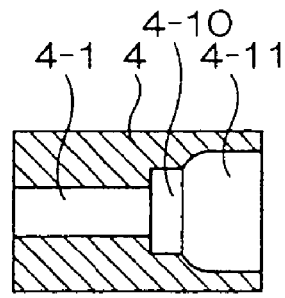
FIG.8F
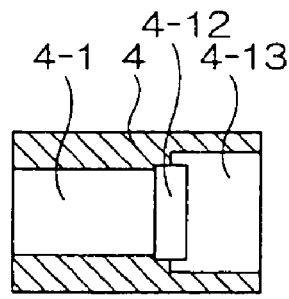
FIG.8G

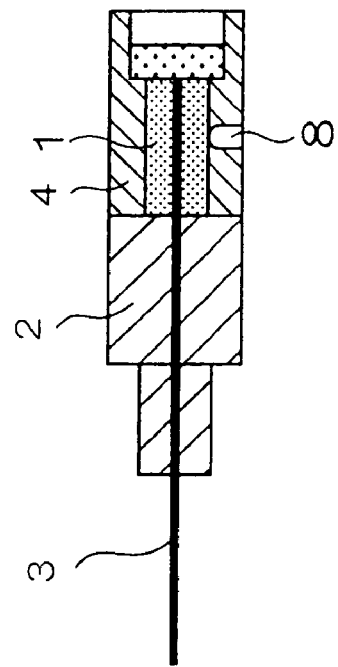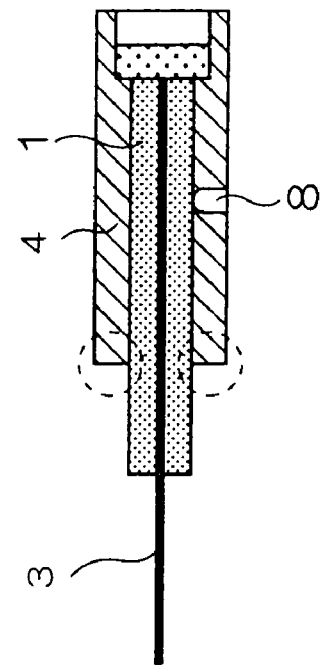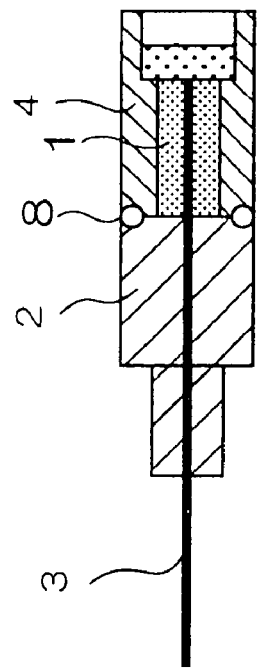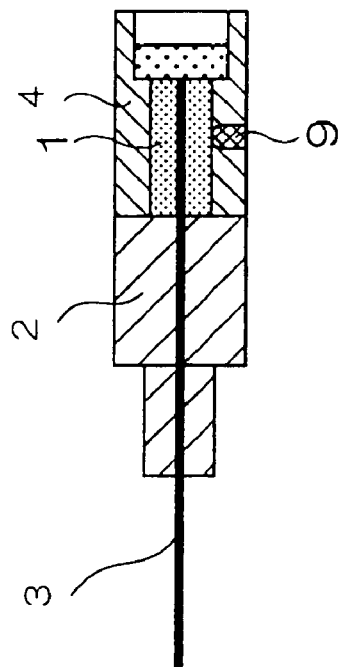
FIG.9
FIG.9A
FIG.9B
FIG.9C
FIG.9D

FIG.10
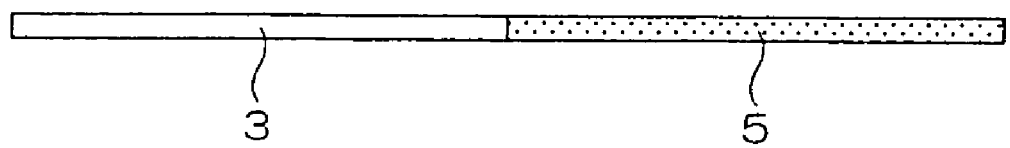
FIG.10A
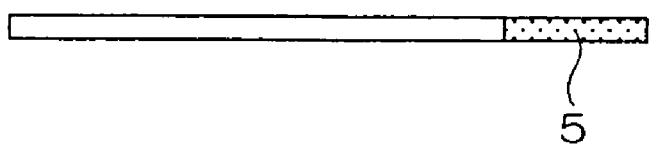
FIG.10B
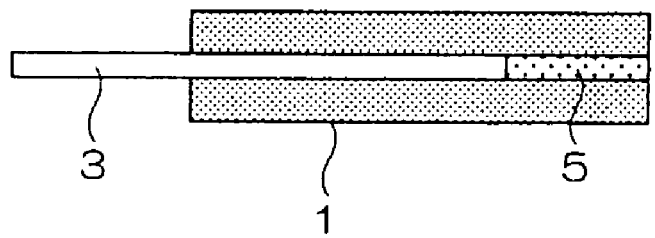
FIG.10C

FIG.15
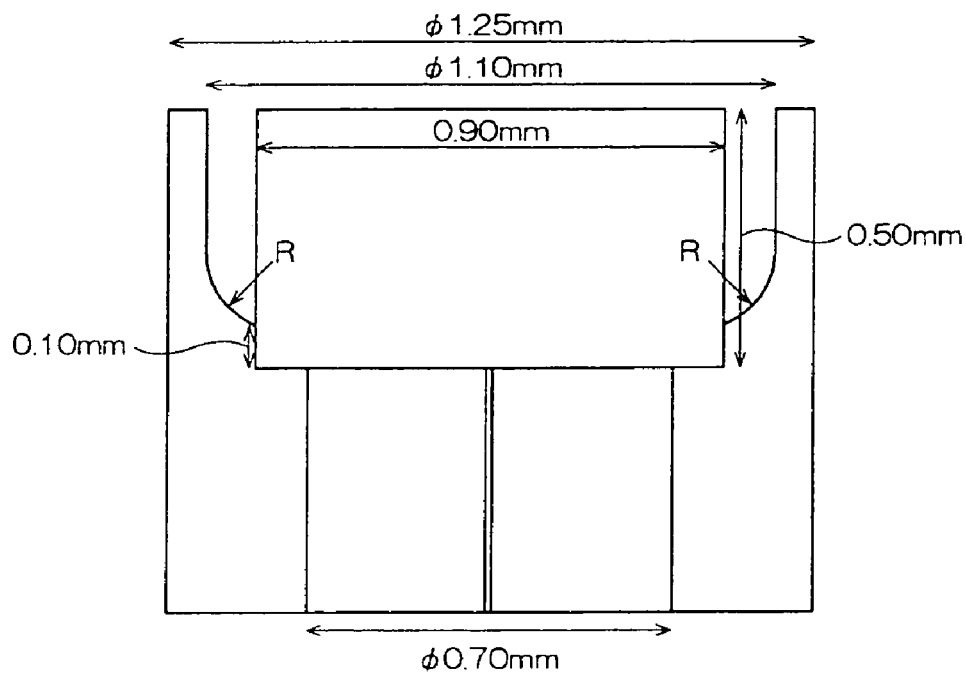
FIG.15A
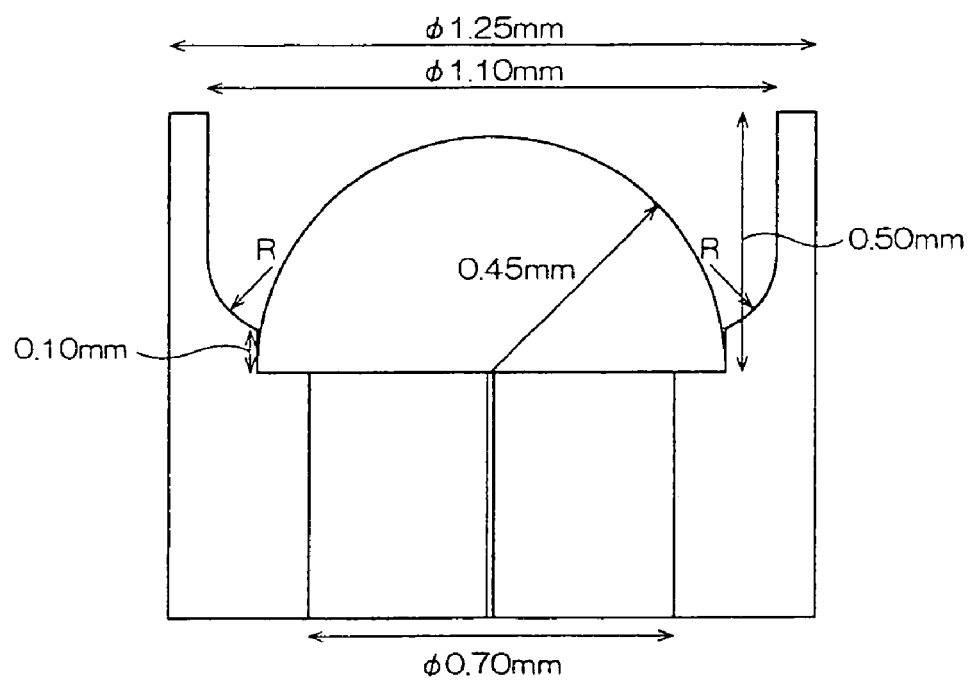
FIG.15B

OPTICAL COMPONENT, LIGHT CONVERTING MEMBER, AND LIGHT EMITTING DEVICE

This application claims the benefit under 35 U.S.C. §119 of Japanese Patent Application No. 2005-357175, filed on Dec. 12, 2005, and application No. 2006-325846, filed in Japan on Dec. 1, 2006, which are hereby incorporated by reference as if fully set forth herein.

BACKGROUND OF THE INVENTION

1. Field of the Invention

The present invention relates to an optical component that can be attached to an end portion of a light guiding member, and a light converting member used in the optical component.

2. Description of the Related Art

Conventionally, lamps have been proposed in which light from a light source is transmitted to a disperser through a separator such as optical fibers so as to distribute light in desired patterns or to change the color of light (see Japanese Translation of PCT International Application No. 2003-515899).

However, in such conventional lamps, a disperser is merely attached to the top of a separator such as an optical fiber, so that further improvement has been needed to an optical component that can be attached to an end portion of a light guiding member such as an optical fiber.

Consequently, an object of the present invention is to provide an optical component that can be attached to an end portion of an light guiding member, and a light converting member used in the optical component.

SUMMARY OF THE INVENTION

According to the present invention, the aforementioned difficulties can be solved as below.

The present invention concerns an optical component comprising a cap having an engaging portion defining a bore engaged with an end member of a light guiding member, and an arranging portion defining an opening connected to the bore in the engaging portion, and a light converting member disposed in the opening defined in the arranging portion.

The arranging portion preferably has an inner wall defining an opening in a shape for extracting light from a side opposite the engaging portion.

The arranging portion preferably has an inner wall continuing from the inner wall of the bore defined in the engaging portion and defining a cylinder-shaped opening with an inside diameter larger than an inside diameter of the bore in the engaging portion.

The arranging portion preferably has an inner wall continuing from the inner wall of the bore defined in the engaging portion and defining a truncated cone-shaped opening tapering toward the engaging portion.

The arranging portion preferably has an inner wall continuing from the inner wall of the bore defined in the engaging portion and defining a cylinder-shaped opening with an inside diameter larger than an inside diameter of the bore in the engaging portion, and an inner wall continuing from the inner wall of the cylinder-shaped opening and defining a truncated cone-shaped opening tapering toward the engaging portion.

The arranging portion preferably has an inner wall continuing from the inner wall of the bore defined in the engaging portion and defining a first truncated cone-shaped opening tapering toward the engaging portion, an inner wall continuing from the inner wall of the first truncated cone-shaped opening and defining a cylinder-shaped hole with an inside diameter larger than the inside diameter of the bore in the engaging portion, and an inner wall continuing from the inner wall of the cylinder-shaped opening and defining a second truncated cone-shaped opening tapering toward the engaging portion.

The arranging portion preferably has an inner wall continuing from the inner wall of the bore defined in the engaging portion and defining a bowl-shaped opening, concave toward the engaging portion.

The arranging portion preferably has an inner wall continuing from the inner wall of the bore defined in the engaging portion and defining a cylinder-shaped opening with an inside diameter larger than the inside diameter of the bore in the engaging portion, and an inner wall continuing from the inner wall of the cylinder-shaped opening and defining a bowl-shaped opening concave toward the engaging portion.

The arranging portion preferably has an inner wall continuing from the inner wall of the bore defined in the engaging portion and defining a first cylinder-shaped opening with an inside diameter larger than the inside diameter of the bore in the engaging portion, and an inner wall continuing from the inner wall of the first cylinder-shaped opening and defining a second cylinder-shaped opening with an inside diameter larger than the inside diameter of the first cylinder-shaped opening.

The cap preferably has a thermal expansion coefficient equal to that of the light converting member.

The light converting member has a shape for extracting light from a side opposite the engaging portion.

The light converting member preferably has a dome shape convex toward a light emission side, a disk shape, a spherical shape, or a lens shape.

A fixing means fixing the light converting member to the cap is preferably provided between the light converting member and the engaging portion.

A fixing means fixing the light converting member to the cap is preferably provided to a surface of the light converting member opposite the engaging portion.

The fixing means is preferably provided to a peripheral part of a surface of the converting member opposite the engaging portion.

The fixing means preferably has a dome shape convex toward a side opposite the engaging portion.

The light converting member is preferably fused to the cap.

The fusion is preferably a high temperature fusion.

The cap is preferably fitted to the light guiding member and at least one part of a side surface thereof is engaged with the end member of the light guiding member.

The longitudinal length of the cap is preferably two-thirds or more of the length of the light guiding member.

The present invention relates to a light converting member having approximately the same diameter as a diameter of a light guiding member and joining to an emitting end of the light guiding member.

The present invention also relates to a light converting member having approximately the same diameter as a diameter of a core portion of a light guiding member and joining to an emitting end of the light guiding member.

The light converting member preferably has a length arbitrarily adjusted by cleaving.

The light converting member is preferably inserted to an end member of the light guiding member after joined to the light guiding member, and an end surface of the light converting member is ground to an arbitral length.

The present invention also concerns a light emitting device comprising an excitation light source emitting excitation light, a light guiding member transmitting excitation light emitted from the excitation light source, an end member of a light guiding member provided at an end portion of the light guiding member, and an optical component provided at an end portion of the light guiding member, wherein the optical component is the optical component as described above.

It is preferable that the excitation light source is a semiconductor light emitting device and the light guiding member is an optical fiber.

An innovative optical component that can be attached to an end portion of a light guiding member, and a light converting member used in the optical component can be provided according to the present invention.

BRIEF DESCRIPTION OF THE DRAWINGS

FIGS. 3A to 3F are views showing a construction of an optical component according to Embodiment 3 of the present invention.

FIGS. 8A to 8G are cross-sectional views illustrating examples of arranging portion of the cap.

FIGS. 9A to 9D are cross-sectional views illustrating examples of fixing method of the cap and the flange.

FIGS. 10A to 10C are views showing a light converting member according to Embodiment 7 of the present invention.

FIGS. 15A and 15B are views showing examples of a part of an optical component according to Example 5 of the present invention.

DETAILED DESCRIPTION OF THE PREFERRED EMBODIMENTS

The preferred embodiments of the present invention will be described in detail below with reference to the accompanying drawings.

FIGS. 1A to 1E are views showing a construction of an optical component according to Embodiment 1 of the present invention.

Figure 1:
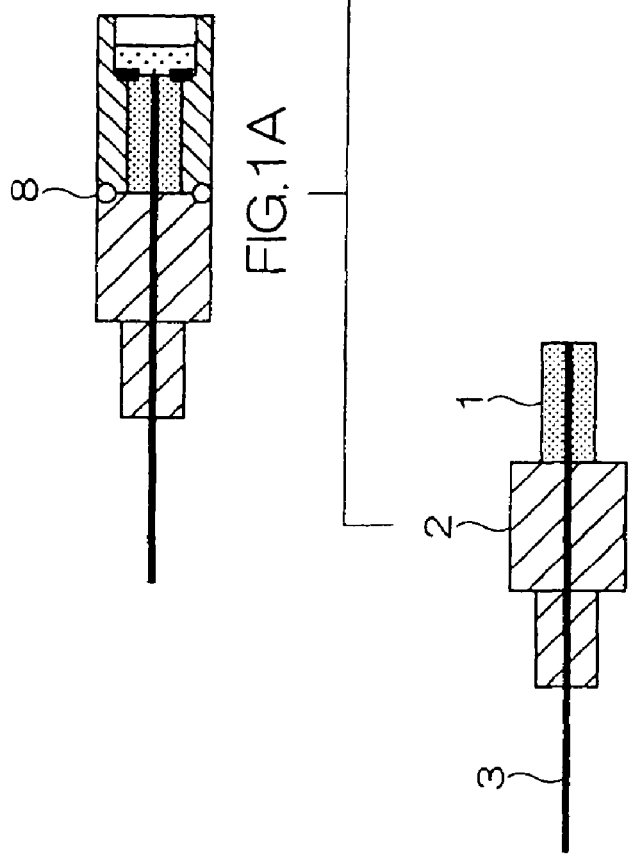
FIGS. 1A to 1E are views showing a construction of an optical component according to Embodiment 1 of the present invention.
Figure 2:
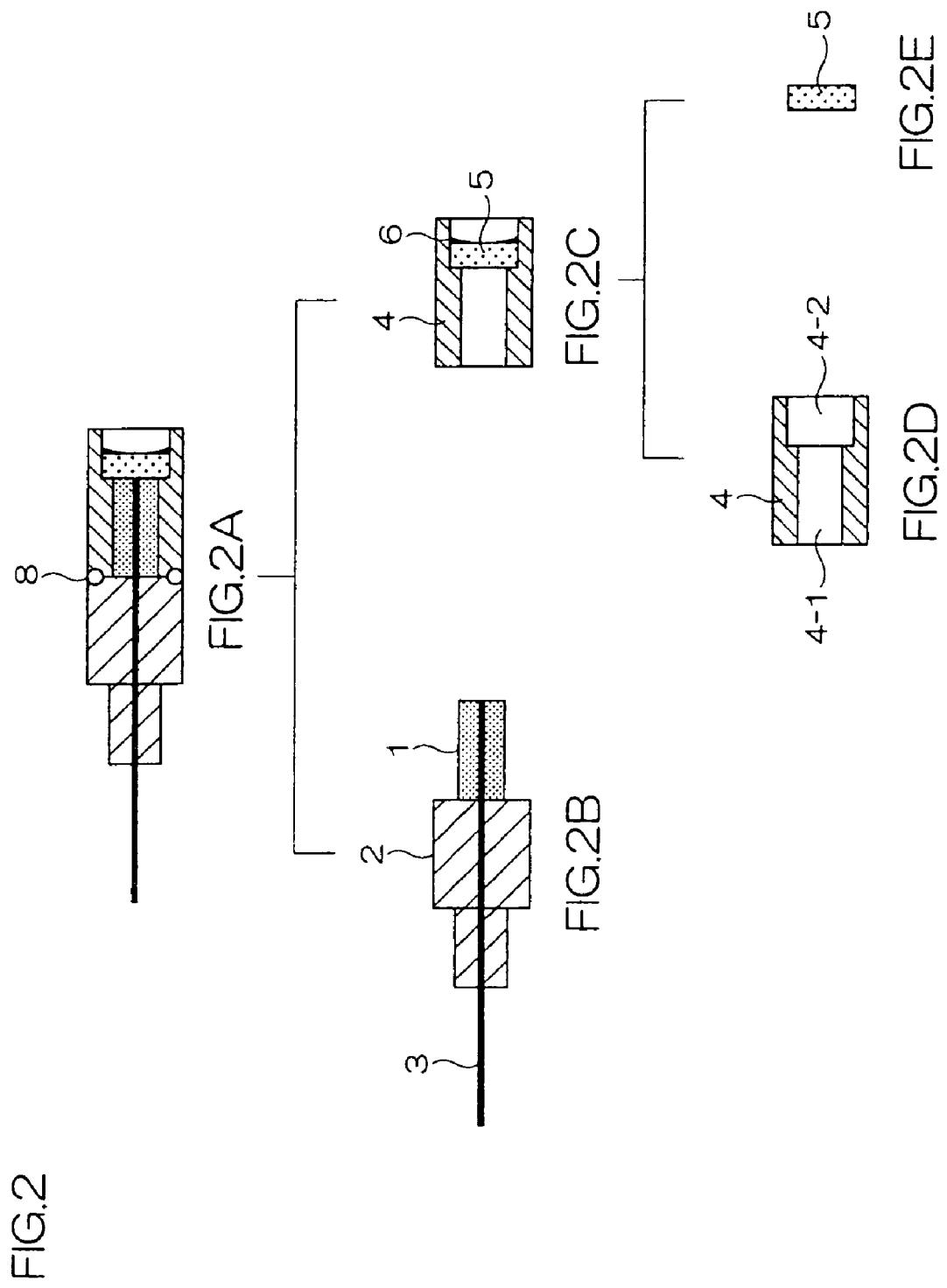
FIGS. 2A to 2E are views showing a construction of an optical component according to Embodiment 2 of the present invention.
Figure 4:
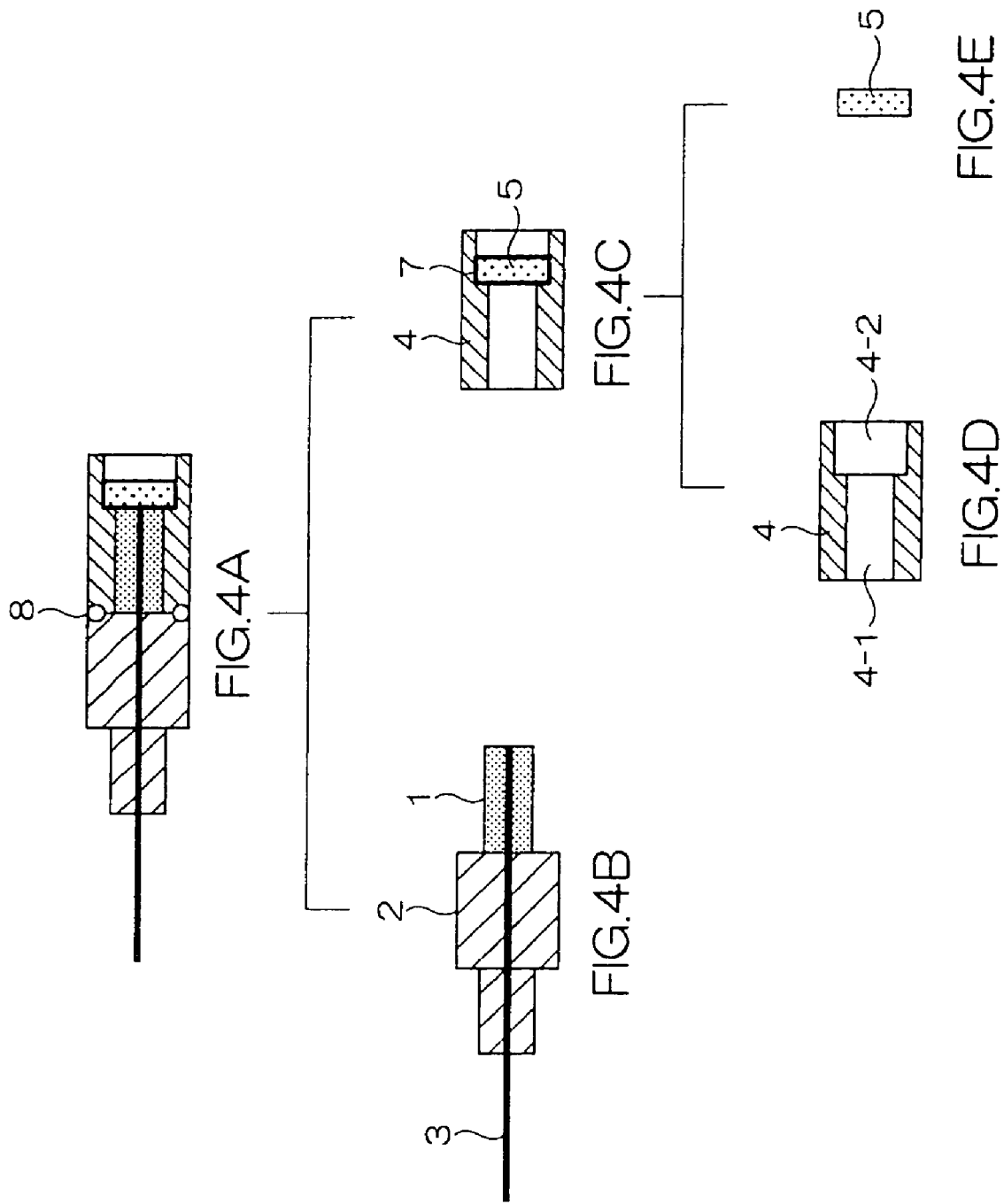
FIGS. 4A to 4E are views showing a construction of an optical component according to Embodiment 4 of the present invention.
Figure 5:
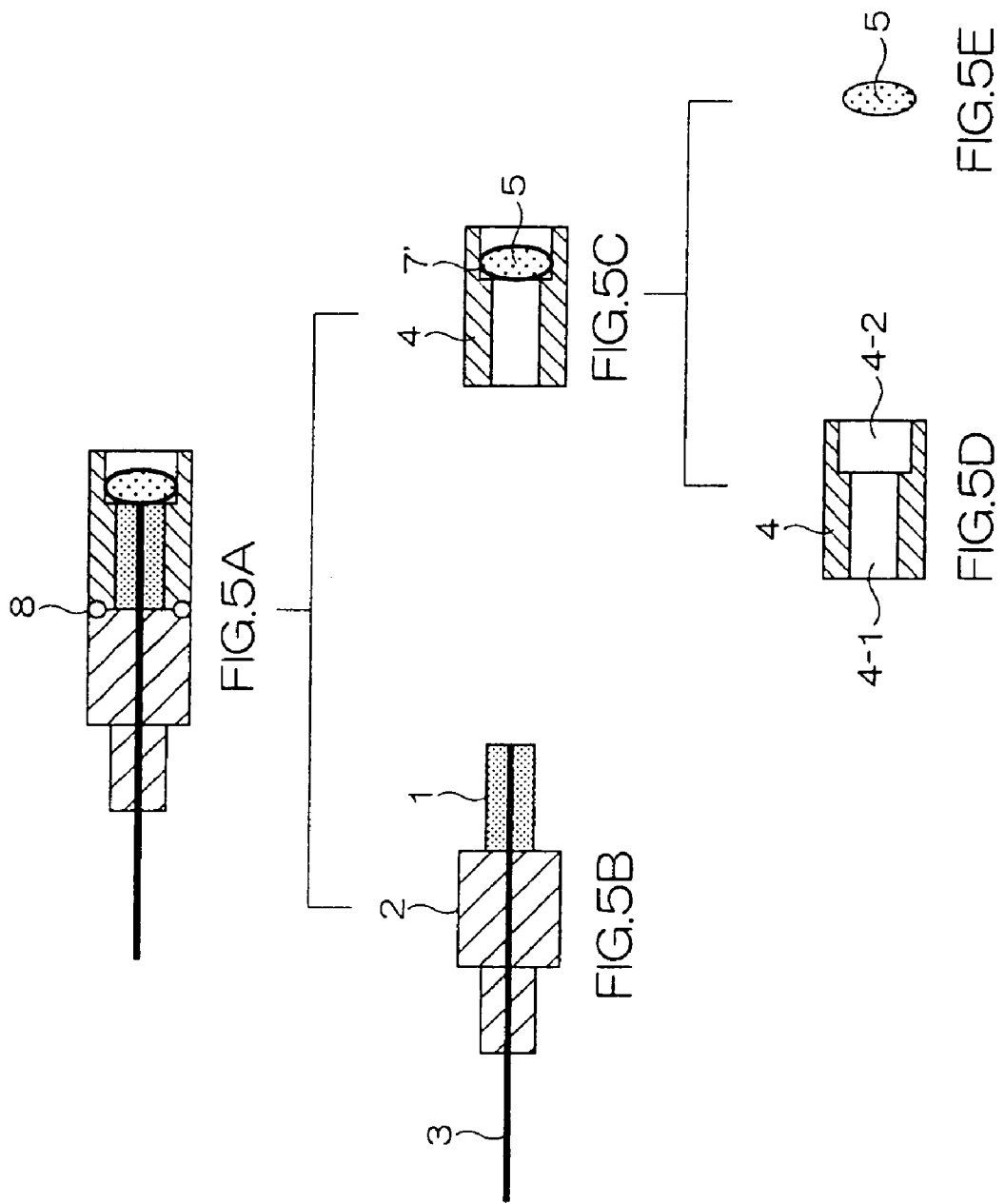
FIGS. 5A to 5E are views showing a construction of an optical component according to Embodiment 5 of the present invention.
Figure 6:
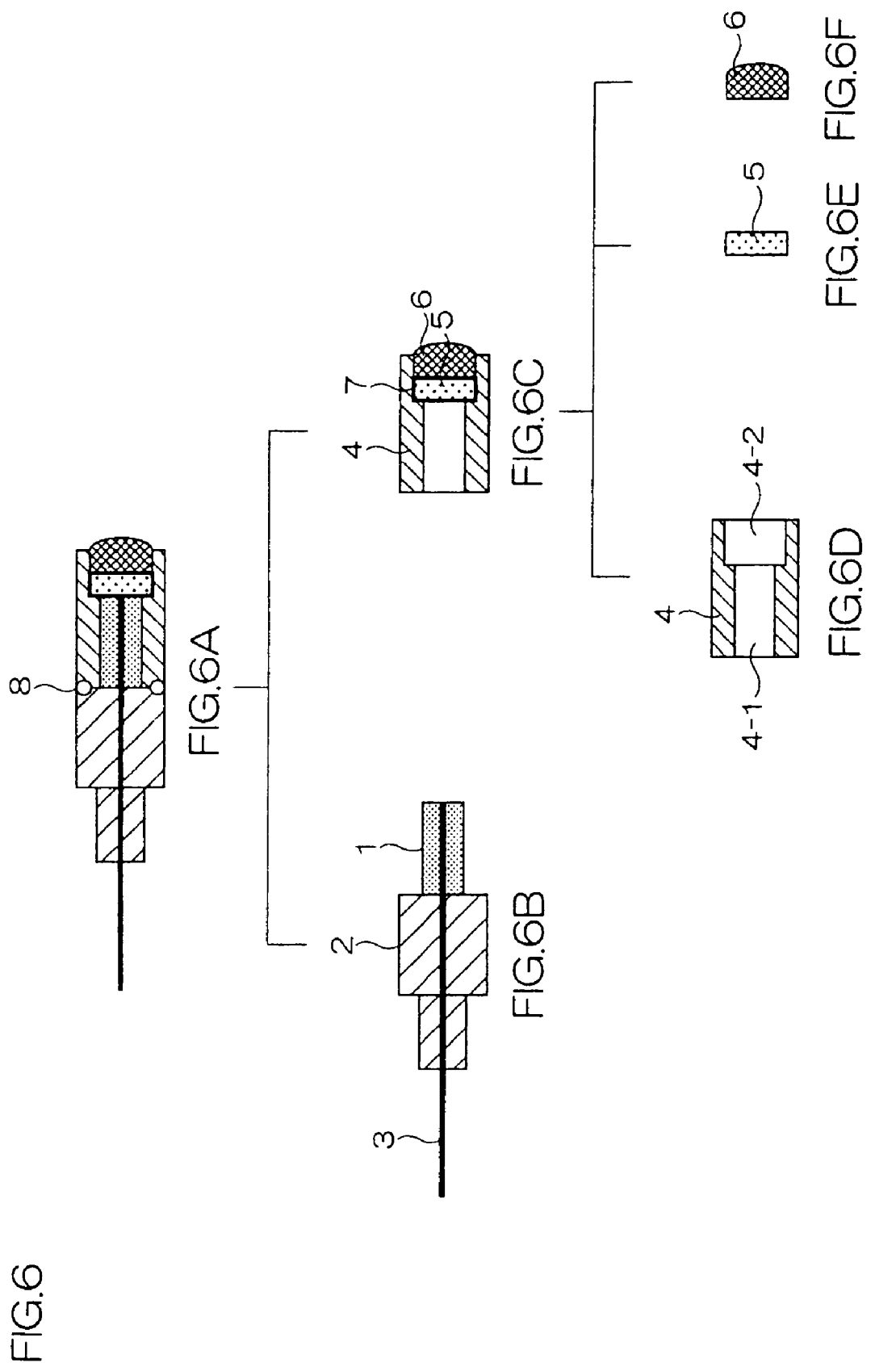
FIGS. 6A to 6F are views showing a construction of an optical component according to Embodiment 6 of the present invention.

As shown in FIG. 1, the optical component according to Embodiment 1 comprises a cap 4 and a light converting member 5. The cap 4 has an engaging portion 4-1 defining a bore engaged with a ferrule 1, and an arranging portion 4-2 defining an opening connected to the bore of the engaging portion 4-1. The ferrule 1 is installed to a flange 2 and an optical fiber 3 is inserted therethrough. The light converting member 5 is disposed in the opening defined in the arranging portion 4-2 of the cap 4 and fixed by a low melting glass (or resin) provided between the light converting member 5 and the engaging portion 4-1. The cap 4 and the flange 2 are fixed by YAG welding 8. The term "end member of the light guiding member" in the present specification refers to the ferrule 1 and the flange 2. The ferrule 1 and the flange 2 may be composed by combining different members or molded simultaneously.

According to Embodiment 1, the light converting member 5 can be mounted not to the tip of the ferrule 1 or the optical fiber 3, but to the cap 4 which is a separate member from the ferrule 1 or the optical fiber 3. Therefore, if the light converting member 5 is defective, it can be handled not as a unit of the ferrule 1 and optical fiber 3 to which the cap 4 is attached, but as a unit of the cap-portion. Therefore, according to Embodiment 1, the yield of the products that use the optical fiber can be improved.

In a case where the light converting member 5 is fixed by a low melting glass (or a resin) 6 provided between the light converting member 5 and the engaging portion 4-1, it is necessary that before inserting the light converting member 5 to the cap 4, a low melting glass (or a resin) 6 is inserted to the cap 4 and the inserted low melting glass (or the resin) 6 is formed into a desired shape (a shape in which at least the low melting glass (or resin) 6 does not cover the end surface of the optical fiber). In addition, as described above, considerable degrees of accuracy is required to place the optical converting member 5 into the cap 4, while maintaining the low melting glass (or resin) 6 in the desired shape. Consequently, in the present invention, the light converting member 5 can also be fixed by providing the low melting glass (or resin) 6 on one of the surfaces of the light converting member 5 opposite the engaging portion 4-1. With this, the low melting glass (or resin) 6 can be inserted into the cap 4 after inserting the light converting member 5 to form the low melting glass (or resin) 6 into a desired shape, and then the light converting member 5 can be fixed to the cap 4. Therefore, the low melting glass (or resin) 6 can be easily formed into the desired shape. In addition, in this case, the accuracy necessary to process the low melting glass (or resin) 6 can also be satisfied comparatively easily, so that the yield can be improved.

FIGS. 2A to 2E are views showing a construction of an optical component according to Embodiment 2 of the present invention.

Embodiment 2 is different from above-mentioned Embodiment 1 in that a low melting glass (or resin) 6 is provided to a peripheral part of a surface of the light converting member 5 opposite the engaging portion 4-1. With this arrangement, the amount of the low melting glass (or resin) 6 at a center of the light converting portion 5 (a part corresponding to an end surface of an optical fiber 3) can be reduced, so that light extraction efficiency can be improved.

If a disk-shaped low melting glass (or resin) 6 is applied to a part of the light converting member 5 opposite the engaging portion 4-1 and heat is applied thereto, the low melting glass (or resin) 6 is drawn by surface tension to the peripheral part of the light converting member 5, so that the cap 4 can be easily fixed to the part of the light converting portion 5 opposite the engaging portion 4-1.

FIGS. 3A to 3F are views showing a construction of an optical component according to Embodiment 3 of the present invention.

Embodiment 3 is different from above-mentioned Embodiment 2 in that a low melting glass (or resin) 6 provided to a side of a light converting member 5 opposite an engaging portion 4-1 is dome-shaped convex toward the opposite side of the engaging portion 4-1. With this arrangement, emitted light from an optical fiber 3 can be prevented from totally reflecting at the surface opposite the engaging portion 4-1, so that light extraction efficiency can be improved.

FIGS. 4A to 4E are views showing a construction of an optical component according to Embodiment 4 of the present invention.

Embodiment 4 is different from above-mentioned Embodiment 1 in that a light converting member 5 is fixed to a cap 4 by way of fusion 7. With this arrangement, fixing of the light converting member 5 and the cap 4 can be conducted easier and more accurately than using a low melting glass (or resin) 6. Moreover, when the light converting member 5 is fixed to the cap 4 by way of fusion 7, the light converting portion 5 will not be covered by the low melting glass (or resin) 6 neither partially nor entirely, so that light emitted from an optical fiber 3 will not be blocked by the low melting glass (or resin) 6, and light extraction efficiency can be improved.

FIGS. 5A to 5E are views showing a construction of an optical component according to Embodiment 5 of the present invention.

Embodiment 5 is different from above-mentioned Embodiment 4 in that fusion is a high-temperature fusion 7'. When a light converting member 5 is fixed to a cap 4 by way of high-temperature fusion 7', the light converting member 5 expands due to fusion. As a result, for example, a disk-shaped light converting member 5 becomes lens-shaped. With this arrangement, in the light converting member 5, total reflection may hardly occur not only at a part opposite the engaging portion 4-1, but also at a engaging portion. Moreover, when the light converting member 5 is lens-shaped, the end surface of the optical fiber 3 and the light converting member 5 can be contact without interposition of air or the like, so that decrease in the light extracting efficiency due to interposition of the air or the like between the end face of the optical fiber 3 and the light converting member 5 can be suppressed.

FIGS. 6A to 6F are views showing a construction of an optical component according to Embodiment 6 of the present invention.

Embodiment 6 is different from above-mentioned Embodiment 5 in that a light converting member 5 is fixed to a cap 4 by fusion 7, and a dome-shaped low melting glass (or resin) 6, convex toward a side opposite an engaging portion 4-1, is provided to a light converting member 5 to a side opposite the engaging portion 4-1. With this arrangement, the light converting member 5 can be easily fixed to the cap 4 as in Embodiment 5 and without forming the light converting member 5 lens-shaped, total reflection at a part of the light converting member 5 opposite the engaging portion 4-1 can be reduced, so that temperature control in high temperature fusion that is necessary to form a lens shape becomes unnecessary.

FIGS. 7A to 7D and 7A' to 7D' show cross-sectional views of examples of the light converting member.

The shape of the light converting member 5 is not specifically limited, however, it is preferably formed so as to extract light from the side opposite the engaging portion 4-1. Examples of such shapes include the shapes described below.

Figure 7:
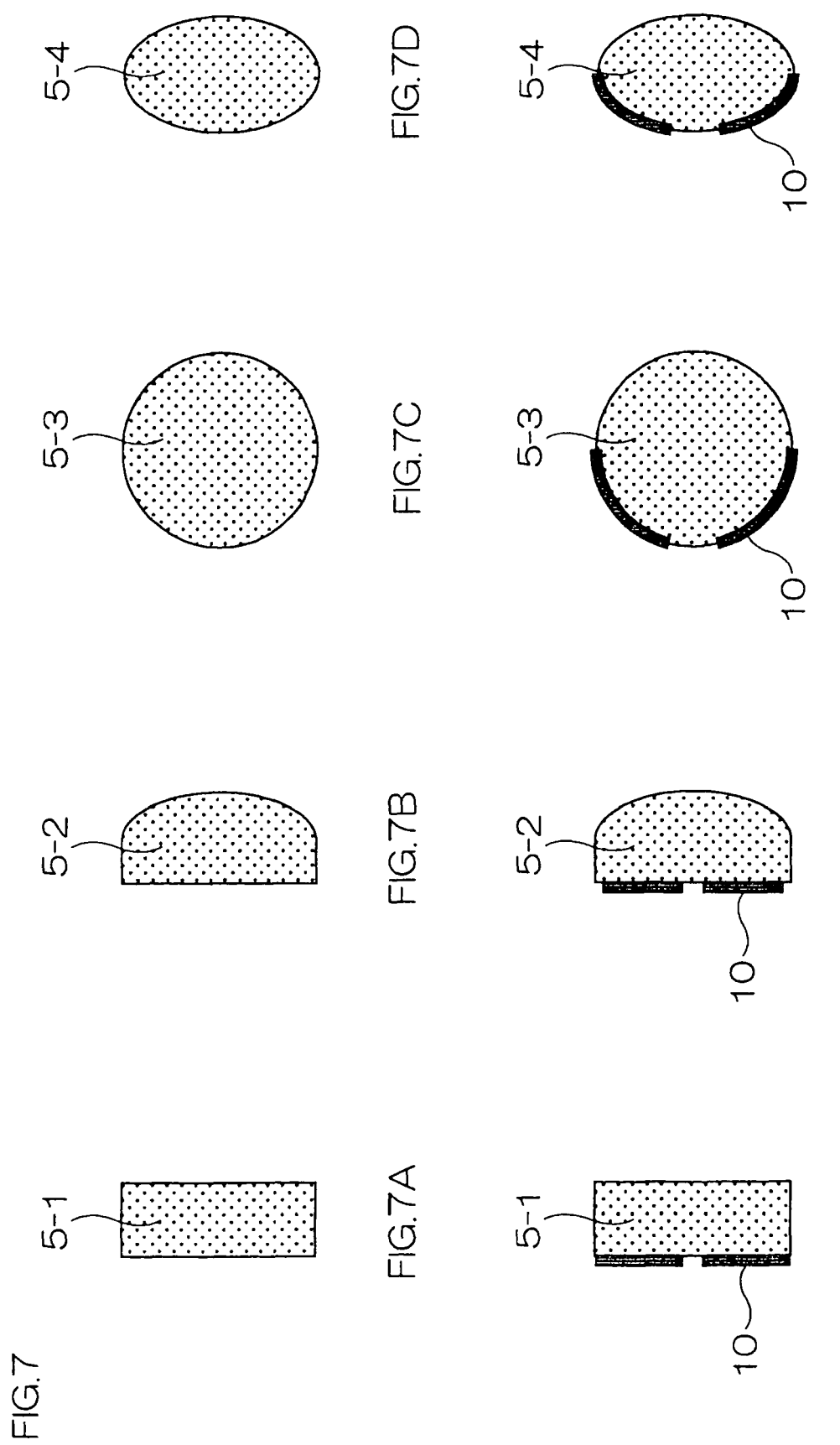
FIGS. 7A to 7D and 7A' to 7D' are cross-sectional views showing examples of the light converting member 5.

FIG. 7A shows a shape of the light converting member 5 according to Embodiments 1 to 6, described with reference to FIGS. 1 to 6, and the shape of the light converting member 5-1 is a disk. A disk-shape is easily formed compared with other shapes, so that the yield can be improved.

FIG. 7B shows another example of the shape of the light converting member 5. Here, the shape of the light converting member 5-2 is a dome convex toward the emission side. With this shape, total reflection may hardly occur at the emission side of the light converting member 5-2, so that the light extraction efficiency can be improved.

FIG. 7C shows another example of the shape of the light converting member 5. Here, the shape of the light converting member 5-3 is a sphere. With this, total reflection may hardly occur not only at the emission side, but also at the incident side of the light converting member 5-3.

FIG. 7D shows another example of the shape of the light converting member 5. Here, the shape of the light converting member 5-4 is a lens. With this, total reflection may hardly occur not only at the emission side, but also at the incident side of the light converting member 5-4. In addition, without applying a high temperature fusion 7', the end surface of the optical fiber 3 and the light converting member 5-4 can establish contact without interposition of air or the like, so that decrease in the light extracting efficiency due to interposition of air or the like between the end surface of the optical fiber 3 and the light converting member 5-4 can be suppressed. Also, in a case where the light converting member is lens-shaped as shown in FIG. 7D, occurrence of irregular color emitted from the light converting member 5-4 can be prevented, compared with a case where the light converting member is sphere-shape as shown in FIG. 7C.

When a phosphor is included in the light converting member 5, the wavelength of at least a part of light emitted from the optical fiber 3 can be converted. When a diffusing agent is included in the light converting member 5, the directivity of light emitted from the optical fiber 3 can be reduced, so that the light becomes gentle to the eyes. On the contrary, the optical density of the light emitted from the optical fiber 3 can be further increased, without inclusion of a diffusing agent and the like to the light converting member 5. As described above, any members can be used for the light converting member as long as the member is capable of changing the properties (wavelength and direction of light) of light incident to the light converting member by converting the wavelength of light or diffusing light), regardless of whether the member is transparent, translucent, or opaque, or organic or inorganic.

As shown in FIGS. 7A' to 7D', when a reflection film 10 is applied to the surface of the light converting member 5 at the opposite side from the engaging portion 4-1, light emitted from the optical fiber 3 can be prevented from causing so-called halation, that occurs when light emitted from the optical fiber 3 is reflected within the cap 4 and is incident to the ferrule 1 and the optical fiber 3 and the like. Thus, the optical output can be improved.

For the light converting member 5, a glass is preferably used, but a resin can also be used. The glass used for the light converting member 5 is preferably a silicate glass. Specifically, a silicate glass including at least one kind of alkali metal oxide, alkaline earth metal oxide, boric acid, phosphoric acid and zinc oxide is preferable. The light converting member 5 can be obtained by mixing a phosphor powder and a glass powder and molding the obtained mixed powder by way of, for example, a hot press molding.

The phosphor is only needed to be able to absorb light from the semiconductor light emitting device and to convert it to light of a different wavelength. For example, the phosphor is preferably at least one selected from a nitride-based phosphor, an oxynitride-based phosphor, and a sialon-based phosphor, mainly activated by lanthanoids such as Eu and Ce; an alkaline earth halogen apatite phosphor, an alkaline earth metal borate halogen phosphor, an alkaline earth metal aluminate phosphor, an alkaline earth silicate phosphor, an alkaline earth sulfide phosphor, an alkaline earth thiogallate phosphor, an alkakine earth silicon nitride phosphor, and a germinate phosphor, mainly activated by lanthanoids such as Eu or by transition metal elements such as Mn; a rare earth aluminate phosphor and a rare earth silicate phosphor, mainly activated by lanthanoids such as Ce; and an organic and an organic complexes, mainly activated by lanthanoids such as Eu. As specific examples, the phosphors shown below can be used but it is not limited thereto.

Example of the nitride-based phosphor that is mainly activated with lanthanoid elements such as Eu and Ce includes $M_2Si_5N_8$:Eu, $MAlSiN_3$:Eu, and $MAl_{1-x}B_xSiN_3$:Eu (wherein M represents at least one element selected from among Sr, Ca, Ba, Mg and Zn, and 0<x<1). It also includes, in addition to $M_2Si_5N_8$:Eu, $MSi_7N_{10}$:Eu, $M_{1.8}Si_5O_{0.2}N_8$:Eu and $M_{0.9}Si_7O_{0.1}N_{10}$:Eu (wherein M represents at least one element selected from among Sr, Ca, Ba, Mg and Zn).

Example of the oxynitride phosphor that is mainly activated with lanthanoid elements such as Eu and Ce includes $MSi_2O_2N_2$:Eu (wherein M represents at least one element selected from among Sr, Ca, Ba, Mg and Zn).

Example of the sialon-based phosphor that is mainly activated with lanthanoid elements such as Eu and Ce includes $M_{p/2}Si_{12-p-q}Al_{p+q}O_qN_{16-p}$:Ce, M—Al—Si—O—N (wherein M represents at least one element selected from among Sr, Ca, Ba, Mg and Zn, q is 0 to 2.5, and p is 1.5 to 3).

Example of the alkaline earth halogen apatite phosphor that is mainly activated with lanthanoid elements such as Eu, or with transition metal elements such as Mn includes $M_5(PO_4)_3X$:R (wherein M represents at least one element selected from among Sr, Ca, Ba, Mg and Zn. X represents at least one element selected from among F, Cl, Br, and I. R represents Eu or Mn, or Eu and Mn).

Example of the alkaline earth metal borate halogen phosphor includes $M_2B_5O_9X$:R (wherein M represents at least one element selected from among Sr, Ca, Ba, Mg and Zn. X represents at least one element selected from among F, Cl, Br, and I. R represents Eu or Mn, or Eu and Mn).

Example of the alkaline earth metal aluminate phosphor includes $SrAl_2O_4$:R, $Sr_4Al_{14}O_{25}$:R, $CaAl_2O_4$:R, $BaMg_2Al_{16}O_{27}$:R, $BaMg_2Al_{16}O_{12}$:R, $BaMgAl_{10}O_{17}$:R (wherein R represents Eu or Mn, or Eu and Mn).

Example of the alkaline earth sulfide phosphor include $La_2O_2S$:Eu, $Y_2O_2S$:Eu and $Gd_2O_2S$:Eu.

Example of the rare earth aluminate phosphor that is mainly activated with lanthanoid elements such as Ce includes YAG-based phosphors represented by the formulas: $Y_3Al_5O_{12}$:Ce, $(Y_{0.8}Gd_{0.2})_3Al_5O_{12}$:Ce, $Y_3(Al_{0.8}Ga_{0.2})_5O_{12}$:Ce and $(Y, Gd)_3(Al, Ga)_5O_{12}$. It also includes $Tb_3Al_5O_{12}$:Ce and $Lu_3Al_5O_{12}$:Ce in which portion or all of Y is substituted with Tb or Lu.

Example of other phosphors includes ZnS:Eu, $Zn_2GeO_4$: Mn and $MGa_2S_4$:Eu (wherein M represents at least one element selected from among Sr, Ca, Ba, Mg and Zn, and X represents at least one element selected from among F, Cl, Br and I).

If necessary, the phosphors described above can contain at least one element selected from among Tb, Cu, Ag, Au, Cr, Nd, Dy, Co, Ni and Ti, in place of Eu, or in addition to Eu.

It is possible to use a phosphor which is other than the phosphor described above and has the same performances and effects as those of the phosphors.

FIGS. 8A to 8G are cross-sectional views illustrating examples of arranging portion of the cap.

The arranging portion is a part of the cap 4 other than the engaging portion 4-1 and defines an opening therein to place the light converting member 5. The shape of the light converting member 5 is not specifically limited, however, it is preferably formed so as to have an inner wall defining an opening for extracting light from the side opposite the engaging portion 4-1. Examples of such shapes include the shapes described below.

FIG. 8A illustrates a shape of the arranging portion according to Embodiment 1 to Embodiment 6, described with reference to FIGS. 1 to 6, and the arranging portion has an inner wall continuing from the inner wall of the bore formed in the engaging portion 4-1 and defining a cylinder-shaped opening 4-2 with an inner diameter larger than that of the bore in the engaging portion 4-1. With this arrangement, the shapes of both the engaging portion 4-1 and the opening 4-2 are cylindrical, so that the processing of cap 4 becomes easier and the yield can be improved.

FIG. 8B shows another example of the shape of the arranging portion. Here, the arranging portion has an inner wall continuing from the inner wall of the bore defined in the engaging portion 4-1 and defining a truncated cone-shaped opening tapering toward the engaging portion 4-1. With this arrangement, as shown in FIG. 8B, the cross-section of the side surface of the opening 4-3 becomes a taper-shape widening from the engaging portion toward the side opposite the engaging portion, so that light emitted from the light converting portion 5 to the side surface of the opening 4-3 can be easily directed to the side opposite the engaging portion 4-1, and the light extracting efficiency can be improved.

FIG. 8C shows another example of the shape of the arranging portion. Here, the arranging portion has an inner wall continuing from the inner wall of the bore defined in the engaging portion 4-1 and defining a cylinder-shaped opening 4-4 with an inner diameter larger than that of the bore in the engaging portion 4-1, and an inner wall continuing from the inner wall of the cylinder-shaped opening 4-4 and defining a truncated cone-shaped opening 4-5 tapering toward the engaging portion 4-1. With this arrangement, as shown in FIG. 8B, the cross-section of the side surface of the opening 4-5 becomes a taper-shape widening from the engaging portion 4-1 toward the side opposite the engaging portion 4-1, so that the light extracting efficiency can be improved. Moreover, the light converting member 5 can be placed in a cylinder-shaped opening more stably than in a truncated cone-shaped opening, so that when a cylinder-shaped opening 4-4 with a larger diameter than that of the engaging portion 4-1 is to provide, decrease in the yield due to unstable placement of the light converting portion 5 can be suppressed.

FIG. 8D shows another example of the shape of the arranging portion. Here, the arranging portion has an inner wall continuing from the inner wall of the bore defined in the engaging portion 4-1 and defining a first truncated cone-shaped opening 4-6 tapering toward the engaging portion 4-1, an inner wall continuing from the inner wall of the first truncated cone-shaped opening and defining a cylinder-shaped opening 4-7 with an inside diameter larger than that of the bore in the engaging portion 4-1, and an inner wall continuing from the inner wall of the cylinder-shaped opening 4-7 and defining a second truncated cone-shaped opening 4-8 tapering toward the engaging portion 4-1. With this arrangement, light emitted from the engaging portion 4-1 side of the light converting member 5 to the engaging portion can also be reflected at the side surface of the truncated cone-shaped opening 4-6 and directed to toward the side opposite the engaging portion 4-1, so that the light extracting efficiency can be improved.

FIG. 8E shows another example of the shape of the arranging portion. Here, the arranging portion has an inner wall continuing from the inner wall of the bore defined in the engaging portion 4-1 and defining a bowl-shaped opening 4-9 convex toward the engaging portion 4-1. With this arrangement, a portion on the side surface of the bowl-shaped opening 4-9 at the engaging portion 4-1 side has a curved surface, so that compared with the case where the opening is truncated cone-shaped, much more light reflected at the side surface near the engaging portion 4-1 of the opening can be directed to the side opposite the engaging portion 4-1. In addition, a part of the bowl-shaped opening 4-9 at the side opposite the engaging portion 4-1 may be of tapered-shape in cross-section (a truncated cone-shape tapering toward the engaging portion 4-1, whose tip portion being a spherical surface). In this case, at both the side surfaces close to and distant from the engaging portion 4-1 of the bowl-shaped opening 4-9, light can be easily reflected to a part opposite the engaging portion 4-1.

FIG. 8F shows another example of the shape of the arranging portion. Here, the arranging portion has an inner wall continuing from the inner wall of the bore defined in the engaging portion 4-1 and defining a cylinder-shaped opening 4-10 with an inside diameter larger than that of the bore in the engaging portion 4-1, and an inner wall continuing from the inner wall of the cylinder-shaped opening 4-10 and defining a bowl-shaped opening 4-11 concave toward the engaging portion 4-1. With this arrangement, while much more light reflected at the inner wall of the arranging portion can be directed toward the side opposite the engaging portion 4-1, the light converting member 5 can be stably placed in the cylinder-shaped opening 4-10.

FIG. 8G shows another example of the shape of the arranging portion. Here, the arranging portion has an inner wall continuing from the inner wall of the bore defined in the engaging portion 4-1 and defining a first cylinder-shaped opening 4-12 with an inside diameter larger than that of the bore in the engaging portion 4-1, and an inner wall continuing from the inner wall of the first cylinder-shaped opening 4-12 and defining a second cylinder-shaped opening 4-13 with an inside diameter larger than that of the first cylinder-shaped opening 4-12. With this arrangement, the light converting member 5 can be stably placed into the first column-shaped hole 4-12.

As the cap 4, a member having a same thermal expansion coefficient as that of the light converting member 5 is preferably used, more specifically, a member containing kovar is preferable. With this arrangement, defects that occur in the light converting member 5 and the cap 4 due to the difference of the thermal expansion coefficient between the light converting member 5 and the cap 4 can be prevented and the yield can be improved. In addition, when the light converting member 5 and the cap 4 are fixed with resin, for the same reason as described above, a member having the same material as the resin is preferably used for the cap 4.

FIGS. 9A to 9D are cross-sectional views illustrating examples of fixing method of the cap and the flange.

FIG. 9A is a view showing a fixing method of the cap 4 and the flange 2 according to Embodiments 1 to 6 described with reference to FIGS. 1 to 6. Here, the cap 4 is engaged to the ferrule 1, and YAG welding 8 is applied to the surface where the engaging portion 4-1 is in contact with the flange 2, thereby the cap 4 is fixed to the ferrule 1. With this arrangement, while the cap 4 and the flange 2 can be easily fixed, contact between the portions fixed by YAG welding 8 and the ferrule 1 can be avoided, so that damage to the optical fiber 3 can be reduced.

FIG. 9B is a view showing another example of fixing method of the cap 4 and the flange 2. Here, the cap 4 is engaged to the ferrule 1 and YAG welding 8 is applied to at least one part of the side surface of the cap 4, thereby the cap 4 is fixed to the ferrule 1. With this, the cap 4 and the ferrule 1 can be firmly fixed by way of YAG welding 8.

FIG. 9C is a view showing another example of fixing method of the cap 4 and the flange 2. Here, the cap 4 is engaged to the ferrule 1 and fixed to the ferrule 1 by applying an adhesive agent 9 to at least one hole defined on the side surface thereof. According to the present embodiment, the cap 4 and the ferrule 1 can be fixed without welding, so that the fixing of the cap 4 and the ferrule 1 can be carried out easily and damage to the optical fiber 3 can be reduced.

FIG. 9D is a view showing another example of fixing method of the cap 4 and the flange 2. Here, the cap 4 is engaged to the ferrule 1 and YAG welding 8 is applied to at least one part of the side surface of the cap 4, thereby the cap 4 is fixed to the ferrule 1. The length of the cap 4 is preferably two-thirds or more of the length of the ferrule 1, and thereby the flange 2 becomes unnecessary. With this arrangement, adjustment of the length of the ferrule 1 extending from the flange 2 to contact the tip of the ferrule 1 with the light converting member 5 becomes unnecessary. Therefore, occurrence of unnecessary gap between the cap 4 and flange 2 caused by excess length of the ferrule 1 extending from the flange 2 or, conversely, occurrence of unnecessary gap between the ferrule 1 and the light converting member 5 caused by insufficient length of the ferrule 1 extending from the flange 2, can be prevented.

In FIG. 9D, the side surface of the cap 4 and the ferrule 1 are fixed, however, in the present invention, the tip of the cap 4 (shown in dotted line in FIG. 9D) and the ferrule 1 can be fixed. With this arrangement, welding marks and the like will not be left on the side surface of the cap 4, so that irregularity and the like will not be generated on the surface of the cap 4.

In addition, although not shown in the figure, in the present embodiment, the side surface of the cap 4 and the ferrule 1 can also be fixed by using resistance welding, press fitting, or caulking and the like.

FIGS. 10A to 10C are views showing a light converting member according to Embodiment 7 of the present invention.

As shown in FIG. 10A, in Embodiment 7, a light converting member 5 has approximately the same diameter as that of an optical fiber 3 and is joined to the emission end of the optical fiber 3. With this arrangement, compared with a case using a ferrule 1, the emission end of the optical fiber 3 can be made with a fine diameter, so that applying the optical instruments that make use of the optical fiber to various usages becomes possible. When a phosphor and a diffusing agent and the like are included in the light converting member 5, by adjusting the length of the light converting member 5, the amount of the phosphor and the diffusing agent and the like at the emission end of the optical fiber 3 can be adjusted. The optical fiber 3 and the light converting member 5 can be joined, for example by way of fusion and the like, however, it is needless to say that there are no restriction on the joining means of an optical fiber and a light converting member.

As shown in FIG. 10B, the light converting member can be made with an arbitrary length by cleavage. By cleavage, the light converting member 5 is divided along a crystal plane, so that the end surface of the light converting member 5 can be made smooth. Also, as shown in FIG. 10C, the light converting member 5 may be inserted into the ferrule 1 after joined to the optical fiber 3, and adjusted to an arbitrary length by grinding the end surface thereof. Thus, the length of the light converting member 5 can be finely adjusted.

In addition, although not shown in the figure, in the present embodiment, the length of the light converting member 5 can also be adjusted, by joining the light converting member 5 having approximately the same diameter as that of the optical fiber 3 to the emission end of the optical fiber 3, and then cutting it to a desired length.

In the present embodiment, the diameter of the light converting member 5 is approximately the same as the diameter of the optical fiber 3, however, in the present invention, the diameter of the light converting member 5 may be approximately the same as the diameter of a core portion of the optical fiber 3. The optical fiber 3 comprises a core portion and a cladding portion, and among them, light propagates through the core portion.

Therefore, when the light converting member 5 has approximately the same diameter as that of the core portion of the optical fiber 3, the light converting member 5 is provided only to the emitting portion. Thus, production cost can be reduced and decrease in the yield due to defects of the light converting member 5 provided to a portion that does not emits light can also be prevented.

In Embodiment 7, total reflection of light that occurs at the emission end surface of the light converting member 5 can be controlled by forming the emission end surface of the light converting member 5 spherical, by applying heat using a burner and the like.

Moreover, in Embodiment 7, emission from a side surface of the light converting member 5 can be prevented by providing metal on the side surface of the light converting member 5, by using electroless plating or evaporation coating or the like.

<Light Emitting Device>

Figure 16:
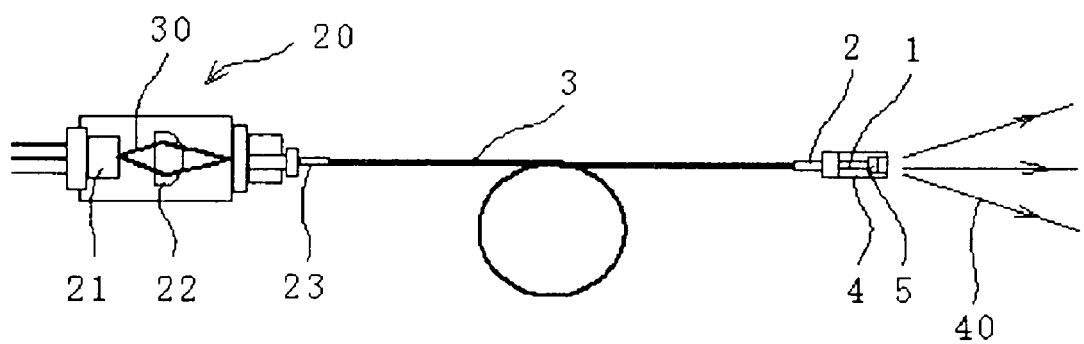
FIG. 16 is a view showing a schematic construction of a light emitting device according to the present invention.

A light emitting device using the optical component described above will be outlined below. FIG. 16 is a view showing a schematic construction of a light emitting device according to the present invention. The size and shape are different from the actual dimensions.

The light emitting device comprises an excitation light source 20, an optical fiber 3, an end member of a light guiding member, and an optical component. The end member of the light guiding member comprises a ferrule 1 and a flange 2. The optical component is mounted at the end member of the light guiding member, and comprises a cap 4 and a light converting member 5.

For the excitation light source 20, a semiconductor light emitting device having a peak emission wavelength in a range from 360 nm to 500 nm can be used. For example, as the semiconductor light emitting device 21, a laser diode device having a peak emission wavelength in the vicinity of 405 nm or in the vicinity of 445 nm is used. The laser diode device is a GaN-based semiconductor device. A GaN-based light emitting diode device can also be used.

As the optical fiber 3, for example, an optical fiber made of quartz is used, but a plastic fiber can also be used.

Excitation light 30 emitted from the semiconductor light emitting device 21 transmits through a lens 22 and is concentrated in an emission portion 23. The emission portion 23 is connected with the optical fiber 3, so that excitation light emitted from the excitation light source 20 travels along the optical fiber 3 and is transmitted to the optical component.

The wavelength of the transmitted light is converted in the light converting member 5, so that light that is different from the light emitted from the excitation light source 20 is discharged to the outside. Light 40 emitted to outside is of a mixed-color of light from the semiconductor light emitting device 21 and light from the light converting member 5.

EXAMPLE 1

Figure 11:
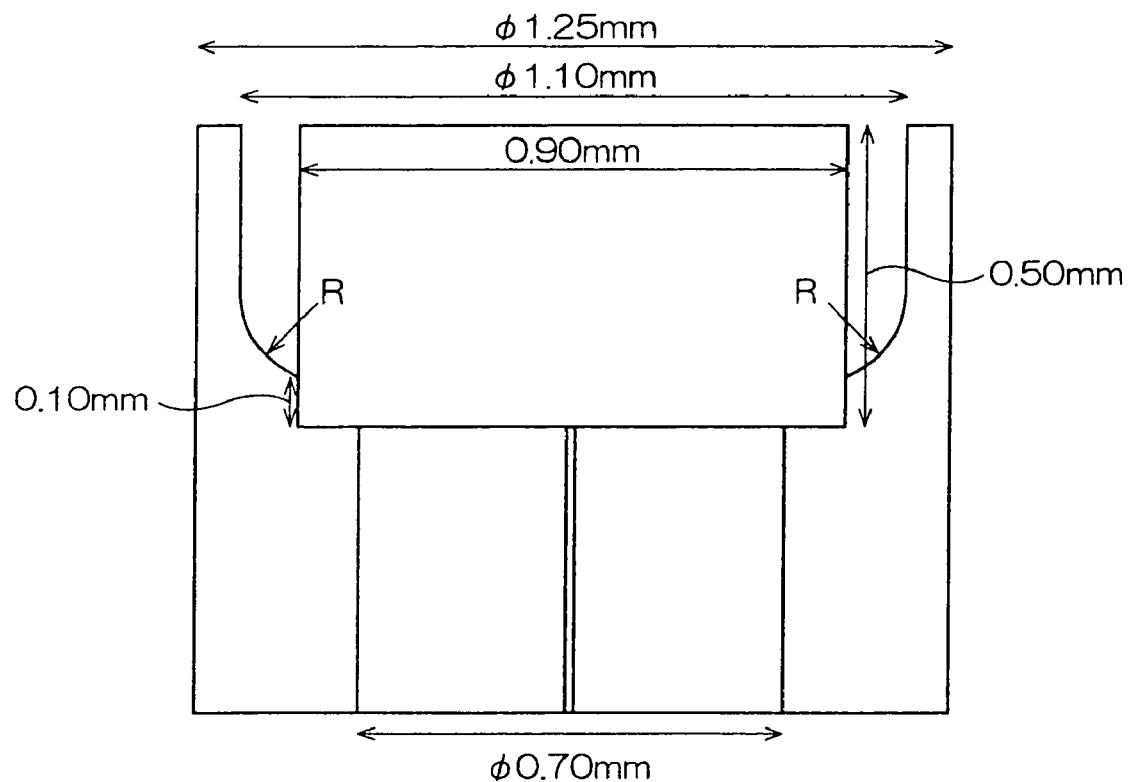
FIG. 11 is a view showing an example of a part of an optical component according to Example 1 of the present invention.

FIG. 11 is a view showing an example of an optical component according to Example 1 of the present invention.

In Example 1, an arranging portion of a cap has an inner wall continuing from the inner wall of a bore defined in an engaging portion and defining a cylinder-shaped opening with an inside diameter larger than that of the bore in the engaging portion.

In addition, the arranging portion of the cap has an inner wall continuing from the inner wall of the cylinder-shaped opening and defining a bowl-shaped opening concave toward the engaging portion. Here, the depth of the cylinder-shaped opening is 0.10 mm. The outside diameter of the cap where the bowl-shaped opening is defined therein is 1.25 mm and the inside diameter of the cap, which is the diameter of the bowl-shaped opening is 1.10 mm. The inside diameter of the bore defined in the engaging portion is 0.70 mm. In addition, the light converting member is disk-shaped with the diameter of 0.90 mm and the height of 0.50 mm. In Example 1, when the light converting member is fixed to the cap by way of fusion, the light extraction efficiency is 65.3%.

EXAMPLE 2

Figure 12:
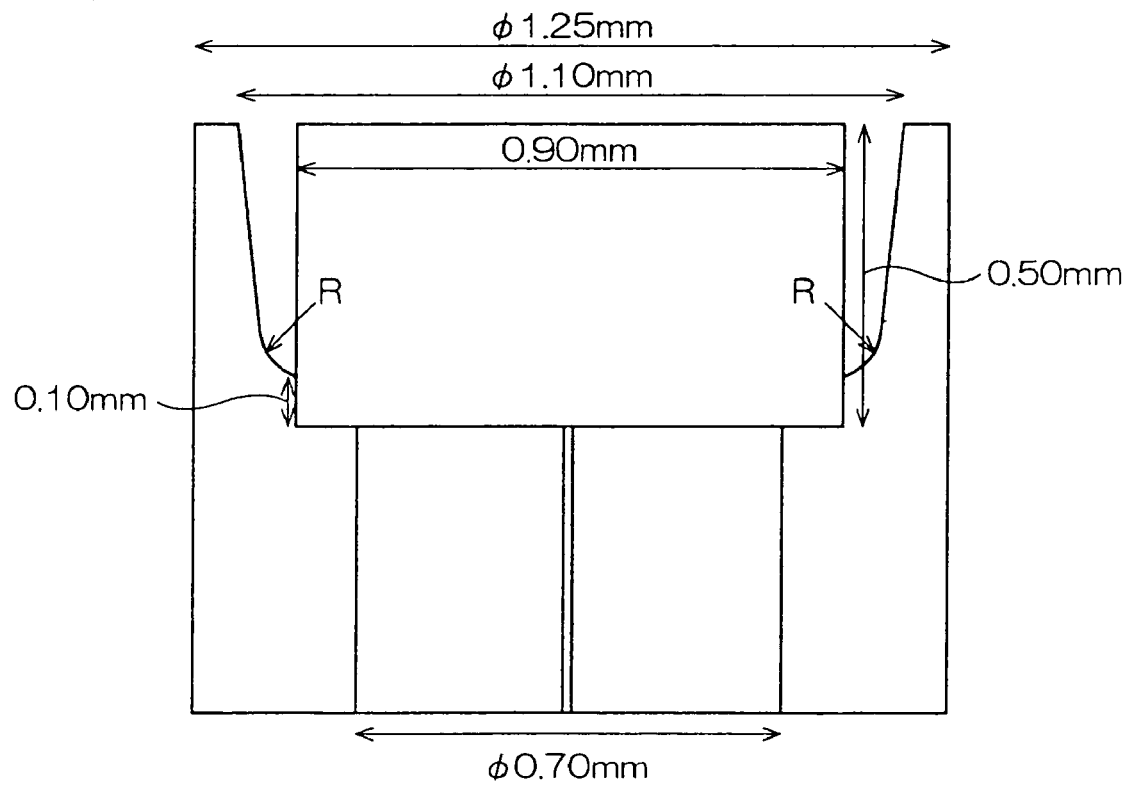
FIG. 12 is a view showing an example of a part of an optical component according to Example 2 of the present invention.

FIG. 12 is a view showing an example of an optical component according to Example 2 of the present invention.

In Example 2, a part of the arranging portion in Example 1 opposite the engaging portion is made taper-shaped in section (a truncated cone-shaped tapering toward the engaging portion, but the tip thereof is spherical). In Example 2, when the light converting member is fixed to the cap by way of fusion, the light extraction efficiency is 64.9%.

EXAMPLE 3

Figure 13:
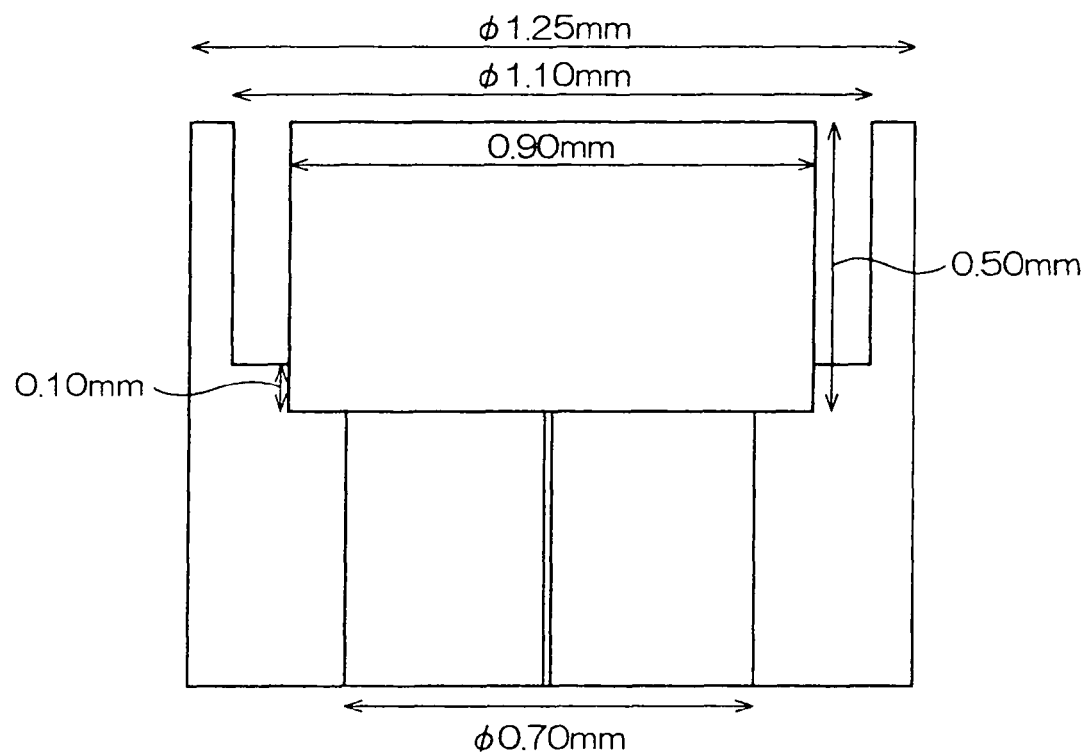
FIG. 13 is a view showing an example of a part of an optical component according to Example 3 of the present invention.

FIG. 13 is a view showing an example of an optical component according to Example 3 of the present invention.

In Example 3, an arranging portion of a cap has an inner wall continuing from the inner wall of a bore defined in an engaging portion and defining a first cylinder-shaped opening with an inside diameter larger than that of the bore in the engaging portion. The arranging portion of the cap has an inner wall continuing from the inner wall of the first cylinder-shaped opening and defining a second cylinder-shaped opening with an inside diameter larger than that of the first cylinder-shaped opening. Here, the depth of the first cylinder-shaped opening is 0.10 mm. The outside diameter of the cap defining the second cylinder-shaped opening is 1.25 mm and the inside diameter of the cylinder-shaped opening is 1.10 mm. The inside diameter of the bore defined in the engaging portion is 0.70 mm. In addition, the light converting member is disc-shaped with the diameter of 0.90 mm and the height of 0.50 mm. In Example 3, when the light converting member is fixed to the cap by way of fusion, the light extraction efficiency is 57.7%.

EXAMPLE 4

Figure 14:
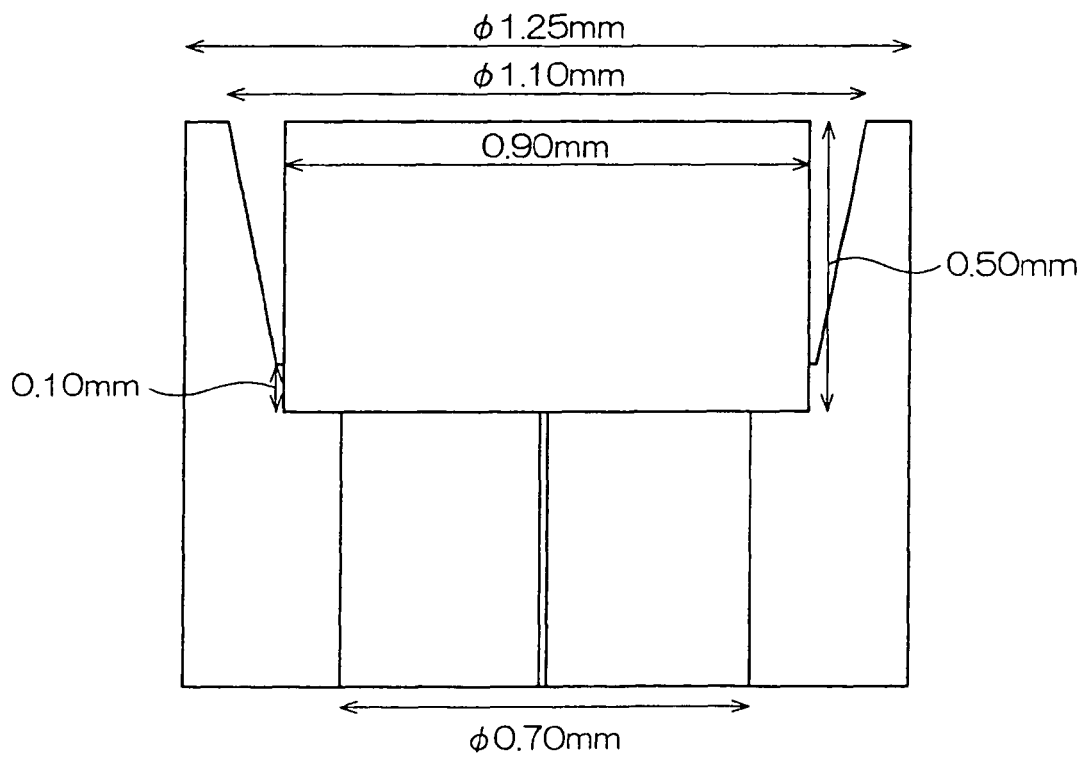
FIG. 14 is a view showing an example of a part of an optical component according to Example 4 of the present invention.

FIG. 14 is a view showing an example of an optical component according to Example 4 of the present invention.

In Example 4, an arranging portion of a cap has an inner wall continuing from the inner wall of a bore defined in the engaging portion and defining a cylinder-shaped opening with an inside diameter larger than that of the bore in the engaging portion.

In addition, the arranging portion of the cap has a truncated cone-shaped opening tapering toward the engaging portion, and continuing from the inner wall of the cylinder-shaped opening. Here, the depth of the cylinder-shaped opening is 0.10 mm. The outside diameter of the cap where the truncated cone-shape opening is defined therein is 1.25 mm and the inside diameter of the truncated cone-shaped opening, which is the diameter of the bowl-shaped opening is 1.10 mm. The inside diameter of the bore defined in the engaging portion is 0.70 mm. In addition, the light converting member is disk-shaped with the diameter of 0.90 mm and the height of 0.50 mm. In Example 4, when the light converting member is fixed to the cap by way of fusion, the light extraction efficiency is 64.2%.

EXAMPLE 5

FIGS. 15A and 15B are views showing examples of a part of an optical component according to Example 5 of the present invention.

In Example 5, the radius of curvature R of a bowl-shaped opening in Embodiment 1 is varied. In FIG. 15A, a light converting member is cylinder-shaped and in FIG. 15B, a light converting member is hemispher-shaped. The light extraction efficiency of this case is shown in TABLE 1.

TABLE 1

| R (mm) | Cylinder-shaped (A) | Hemisphere-shaped (B) |
|---|---|---|
| 0.15 | 65.0% | 62.6% |
| 0.20 | 65.3% | 63.0% |
| 0.25 | 65.4% | 63.5% |
| 0.30 | 65.3% | 63.3% |

In the embodiments described above, the optical components having a ferrule are illustrated. However, in the present invention, not only a ferrule but also any members that are mounted at the end portion of an optical fiber (end member of optical fiber), such as a pipe, a connector, a V-groove (substrate), a fiber array etc., can be used.

In the present invention, whether the above-described engaging portion and/or arranging portion are provided to the optical component is determined by whether the above-described cap has the inner wall defining the opening described above.

In the description above, an example is shown in which the present invention is applied to an optical fiber which is a light guiding member that can wind, however, the present invention can also be applied for all other light guiding members other than the optical fiber.

Also, in the description above, a low melting glass and a resin are used as an example of a means used for fixing the light converting member to the cap. However, in the present invention, any means capable of fixing the light converting member to the cap can be used.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An optical component comprising:
a cap having an engaging portion defining a bore engaged with an end member of a light guiding member, and an arranging portion defining an opening connected to the bore in the engaging portion;
a light converting member, for converting the wavelength of incoming light, disposed in the opening defined in the arranging portion, and
a fixing means fixing the light converting member to the cap provided between the light converting member and the engaging portion, wherein
the fixing means is provided to a peripheral part of a surface of the light converting member at the engaging portion side, and the surface of the light converting member at the engaging portion side is fixed to an inner wall of the cap, and wherein
a tip of the light guiding member comes in contact with the light converting member.

2. The optical component according to claim 1, wherein the arranging portion has an inner wall defining an opening in a shape for extracting light from a side opposite the engaging portion.

3. The optical component according to claim 1, wherein the arranging portion has an inner wall continuing from the inner wall of the bore defined in the engaging portion and defining a cylinder-shaped opening with an inside diameter larger than an inside diameter of the bore in the engaging portion.

4. The optical component according to claim 1, wherein the arranging portion has an inner wall continuing from the inner wall of the bore defined in the engaging portion and defining a truncated cone-shaped opening tapering toward the engaging portion.

5. The optical component according to claim 1, wherein the arranging portion has an inner wall continuing from the inner wall of the bore defined in the engaging portion and defining a cylinder-shaped opening with an inside diameter larger than an inside diameter of the bore in the engaging portion, and an inner wall continuing from the inner wall of the cylinder-shaped opening and defining a truncated cone-shaped opening tapering toward the engaging portion.

6. The optical component according to claim 1, wherein the arranging portion has an inner wall continuing from the inner wall of the bore defined in the engaging portion and defining a first truncated cone-shaped opening tapering toward the engaging portion, an inner wall continuing from the inner wall of the first truncated cone-shaped opening and defining a cylinder-shaped hole with an inside diameter larger than the inside diameter of the bore in the engaging portion, and an inner wall continuing from the inner wall of the cylinder-shaped opening and defining a second truncated cone-shaped opening tapering toward the engaging portion.

7. The optical component according to claim 1, wherein the arranging portion has an inner wall continuing from the inner wall of the bore defined in the engaging portion and defining a bowl-shaped opening, concave toward the engaging portion.

8. The optical component according to claim 1, wherein the arranging portion has an inner wall continuing from the inner wall of the bore defined in the engaging portion and defining a cylinder-shaped opening with an inside diameter larger than the inside diameter of the bore in the engaging portion, and an inner wall continuing from the inner wall of the cylinder-shaped opening and defining a bowl-shaped opening, concave toward the engaging portion.

9. The optical component according to claim 1, wherein the arranging portion has an inner wall continuing from the inner wall of the bore defined in the engaging portion and defining a first cylinder-shaped opening with an inside diameter larger than the inside diameter of the bore in the engaging portion, and an inner wall continuing from the inner wall of the first cylinder-shaped opening and defining a second cylinder-shaped opening with an inside diameter larger than the inside diameter of the first cylinder-shaped opening.

10. The optical component according to claim 1, wherein the cap has a thermal expansion coefficient equal to that of the light converting member.

11. The optical component according to claim 1, wherein the light converting member has a shape for extracting light from a side opposite the engaging portion.

12. The optical component according to claim 1, wherein the light converting member has one of a dome-shape that is convex toward a light emission side, a disk shape, a spherical shape, or a lens shape.

13. The optical component according to claim 1, wherein the light converting member is fused to the cap.

14. The optical component according to claim 13, wherein the fusion is a high temperature fusion.

15. The optical component according to claim 1, wherein the cap is engaged with the end member of the light guiding member and at least one part of a side surface of the cap is fixed to the end member of the light guiding member.

16. The optical component according to claim 1, wherein the longitudinal length of the cap is two-thirds or more of the length of the end member of the light guiding member.

17. A light emitting device comprising:
an excitation light source emitting excitation light;
a light guiding member transmitting excitation light emitted from the excitation light source,
an end member of the light guiding member provided at an end portion of the light guiding member, and
an optical component provided at the end member of the light guiding member, wherein the optical component is the optical component according to claim 1.

18. The light emitting device according to claim 17, wherein the excitation light source is a semiconductor light emitting device and the light guiding member is an optical fiber.

19. The optical component according to claim 1, wherein the cap is detachable.

20. The optical component according to claim 1, wherein a reflection film is applied to a surface of the light converting member at the engaging portion side.

21. An optical component comprising:
a cap having a first end and a second end, the first end of the cap having an engaging portion defining a bore receiving and engaged with an end member of a light guiding member, the second end of the cap having an arranging portion defining an opening connected to the bore in the engaging portion;
a light converting member, for converting the wavelength of incoming light, disposed in the opening defined in the arranging portion at a location adjacent to the second end of the cap, wherein
a fixing means fixing the light converting member to the cap is provided to a peripheral part of a surface of the light converting member at the engaging portion side, and the surface of the light converting member at the engaging portion side is fixed to an inner wall of the cap, and wherein
a light-emitting tip of the light guiding member directly engages a surface of the light converting member.

22. The optical component according to claim 21, wherein the arranging portion has an inner wall defining an opening in a shape for extracting light from a side opposite the engaging portion.

23. The optical component according to claim 21, wherein the arranging portion has an inner wall defining a truncated cone-shaped opening tapering toward the engaging portion.

24. The optical component according to claim 21, wherein a tip of the end member of the light guiding member comes in contact with the light converting member.

25. The optical component according to claim 21, wherein the light converting member includes a phosphor and a glass.

26. The optical component according to claim 21, wherein a reflection film is applied to a surface of the light converting member at the engaging portion side.

* * * * *